Nov. 14, 1967 J. GAMMEL 3,353,110
REGULATED TRANSISTOR AMPLIFIER
Filed Jan. 25, 1965
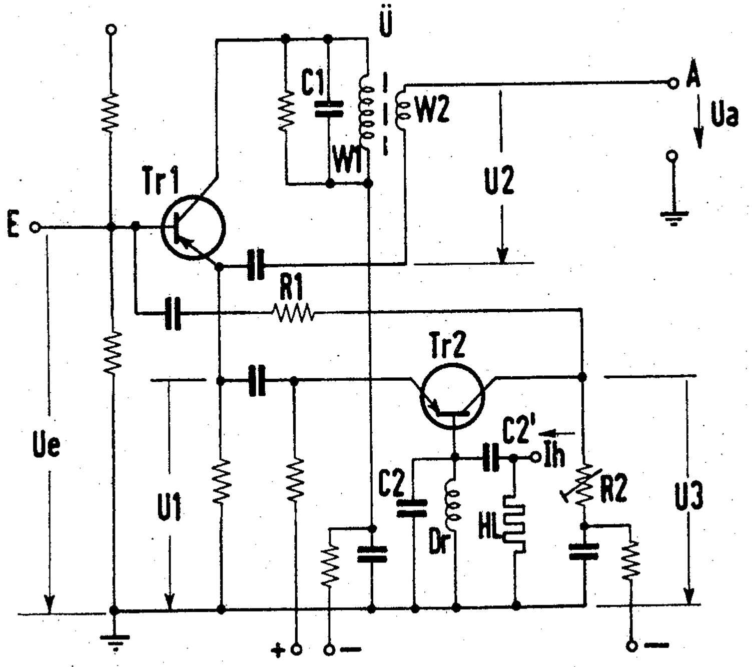
Inventor.
Josef Gammel
By. S Lee & S Lee Attys.

United States Patent Office 3,353,110
Patented Nov. 14, 1967

3,353,110

REGULATED TRANSISTOR AMPLIFIER

Josef Gammel, Munich, Germany, assignor to Siemens Aktiengesellschaft, Munich, Germany Filed Jan. 25, 1965, Ser. No. 427,983
Claims priority, application Germany, Jan. 23, 1964, S 89,199
5 Claims. (Cl. 330—28)

ABSTRACT OF THE DISCLOSURE

A regulated transistor amplifier which is electrically controllable as to its amplification, in which a transistor in common emitter circuit is provided with an impedance, providing feedback, in the emitter branch thereof, the magnitude of which is controllable electrically, which impedance comprises the input resistance of an additional transistor, in base circuit, in which the base resistance, active in A.C. manner, is determined by a direct current controllable thermistor.

The invention relates to an amplifier which can be regulated with respect to its amplification by electrical means.

Amplifiers of this type, particularly with great regulating range, are needed, among other things, at the receiving side of directional radio communications. The propogation of electromagnetic waves in free space is, as is well known, strongly dependent upon atmospheric influences, so that the fluctuations in the signal caused thereby at receiving side have to be compensated in the receiver by means of a generally automatic amplification regulating system. Tube amplifiers are known in which the amplification regulation takes place by electrical means by means of direct-current controlled thermal resistors (thermistors) and, namely, through the feature that the thermistors determine the magnitude of the current negative feedback in the cathode of the tube. This regulating system has over all other known types of regulation the advantage of an especially great regulating range. However, its realization in transistor amplifiers encounters considerable difficulties inasmuch as the thermistors available have, in general an unfavorable regulating range for this purpose. The regulating range achievable by means of thermistors in amplifiers utilizing transistors is, therefore, inadequate for numerous instances of use. There also is added the difficulty that, in contrast to tube amplifiers, the fluctuations occurring with the alteration of the feedback of the input resistance generally have a troublesome effect.

The invention has as its problem that of providing a simple solution for a transistor amplifier in which regulation of its amplification is effected by means of thermistors, overcoming among others the difficulties described.

Proceeding from an amplifier controllable in its amplification, consisting of a transistor, in emitter circuit, in which in the emitter branch of the transistor there is arranged an impedance controllable electrically in its magnitude, presenting a feedback, the problem is solved according to the invention through the feature that the impedance consists of the input resistance of an additional transistor, in base circuit, in which the base resistance, active in alternating current manner, is determined by a direct-current controlled thermistor.

In the invention there is taken as a starting point that the desired thermistor regulation also makes possible in transistor amplifiers a great regulating range if the thermistor can be active as a feedback resistor in the emitter branch of the amplifier transistor, in emitter circuit, over an impedance transformer with a favorable translation ratio. For this purpose, according to the invention, there is suitable in an especially advantageous manner a feedback transistor which is base circuited. There it is of importance that this transistor also receive a current feedback devised from a base resistance, the magnitude of which is determined by a thermistor. Only thus is it assured that the thermistor with favorable resistance value is translated into the emitter branch of the amplifier transistor and also that a troublesome over-control of the impedance transformer, in dependence on the regulation, cannot occur.

In a further development of the invention, the base of the transistor in emitter circuit, can be operatively connected with the collector of the transistor, in base circuit, over a resistor, which, together with the collector resistance of the last-mentioned transistor, forms a voltage divider. This voltage divider lies parallel to the input resistance of the amplifier and has the property that it counteracts changes of the amplifier input resistance occurring in dependence on the thermistor feedback.

Through suitable dimensioning of the voltage divider it can be achieved, in an advantageous manner, that the input resistance of the amplifier remains at least approximately constant with the variating in feedback. The relations take on an especially favorable form when, through a corresponding selection of the collector resistance included in the voltage divider provision is made that the alternating voltage at the collector side of the transistor in base circuit, at minimal feedback of the amplifier is equal to the alternating voltage lying on the amplifier input, both as to amount and phase.

Beyond this, the object of the invention can be additionally considerably improved with respect to its already great regulating range, by a further development, comprising the feature that the transistor, in emitter circuit, has on collector side an output transformer, the secondary winding of which is operatively connected at one side to the emitters of the two transistors in such a way that the alternating voltage induced in the secondary winding is oppositely directed to the alternating voltage appearing at the emitters.

The invention will be hereafter explained in detail with the aid of an example circuit represented in the drawing.

The amplifier circuit according to the invention, represented in the circuit diagram of the drawing, contains a first transistor *Tr*1, in common emitter circuit, in whose emitter branch a feedback second transistor is arranged with its output in common base circuit. The circuit is so dimensioned that the resistance active in the emitter branch of transistor *Tr*1 and presenting a feedback is determined practically only by the input resistance of the transistor *Tr*2. The transistor *Tr*2 has in its base circuit a choke D*r*, the inductance of which is tuned for the frequency range in which the amplifier is to be operated, by means of a capacitor C2 connected thereto in parallel. The effective alternating current resistance in the base of this transistor is determined by a thermistor HL connected in parallel with the choke D*r* over a coupling capacitor C2′, which thermistor, in turn, is externally controlled by the thermistor current I*h*. The transistor *Tr*2 thus functions as an impedance transformer which translates the action of the thermistor HL, with favorable translation ratio, for effecting in its emitter branch, the regulation of the amplification of the transistor *Tr*1.

Between the base of the transistor *Tr*1 and the collector of the transistor *Tr*2 there is arranged a resistor R1, which, together with the adjustable collector resistor R2 of the transistor *Tr*2, forms a voltage divider. This voltage divider lies in parallel with the input E of the amplifier and has, as was already mentioned, the property that it counteracts the fluctuations of the input resistance in dependence on the regulation. This property results from the fact that the alternating voltage drop at the collector resistor R2 of the transistor *Tr*2 has the same phase as the alternating voltage *Ue* at the input E and, moreover, changes in dependence on the regulation in the same direction as the output voltage *Ua* of the amplifier. The magnitude of the collector resistor R2 is so adjusted that the voltage U3 here occurring at minimal feedback, is equal as to the amount and phase to the alternating voltage *Ue* lying on the input. It is thereby achieved that in this regulating condition, at which the input of the input resistance of the amplifier has its lowest value, the resistor R1 is ineffective. If, proceeding from this end condition of the regulation, the thermistor current *Ih* is now reduced, and thereby the feedback both of the transistor *Tr*1 and of the transistor *Tr*2 is increased, the voltage U3 then becomes smaller with respect to the input voltage *Ue* and the resistor R1 becomes active in relation to the voltage differential there across. In other words, this means that the voltage divider lying in parallel with the input E of the amplifier, comprising resistors R1 and R2, becomes increasingly effective as the input resistance of the transistor *Tr*1 increases with growing feedback. With suitable dimensioning of the resistor R1, therefore, it can be achieved that the input resistance of the amplifier remains at least approximately constant over the entire regulating range.

In the collector circuit of the transistor *Tr*1 there is arranged a transformer Ü having the terminal, of its primary winding W1, remote from the collector in alternating current manner, on reference potential. The inductance of the transformer Ü is tuned for the operating range of the amplifier by the capacitor C1. The one side of secondary winding W2 could be placed directly on reference potential. In the present case, however, in alternating current manner, it is connected to the emitters of the two transistors, particularly in such a way that the alternating voltage U2 induced in it is directed oppositely to the alternating voltage U1 appearing on the emitters. Thereby there is achieved an appreciable enlargement of the already very great regulating range, because in this case the output voltage *Ua* can be regulated between the value of zero and a maximal value. Expediently, the circuit is so dimensioned that at minimal feedback—that is, great amplification of the transistor *Tr*1—the voltage U1 is about 10% of the voltage U2 at the secondary winding W2 of the transformer Ü.

Changes may be made within the scope and spirit of the appended claims which define what is believed to be new and desired to have protected by Letters Patent.

I claim:

1. An amplifier which is electrically controllable as to its amplification, comprising a transistor, arranged in common emitter circuit, an impedance, electrically controllable as to its magnitude, disposed in the emitter branch of the transistor and providing feedback, said impedance comprising the input resistance of a second transistor, arranged in common base circuit, and a direct-current-controlled thermistor disposed in the base circuit of said second transistor, whereby the base resistance active in alternating current manner, is determined by the action of said thermistor.

2. An amplifier according to claim 1, wherein the base of the first transistor, in emitter circuit, is connected over a resistor with the collector of the second transistor, a second resistor in the collector circuit of said second transistor, cooperable with said first resistor to form a voltage divider.

3. An amplifier according to claim 2, wherein said voltage divider is so dimensioned that, on the one hand, at minimal feedback of the amplifier, the collector alternating voltage of the second transistor is equal, as to amount and phase, to the alternating voltage appearing at the amplifier input, and, on the other hand, the input resistance of the amplifier, as the feedback varies, remains at least approximately constant as to magnitude.

4. An amplifier according to claim 1, comprising in further combination, an output transformer disposed in the collector side of said first transistor, said transformer having a secondary winding, one side of which is operatively connected to the emitters of the two transistors in such a way that the alternating voltage induced in such secondary winding is directed oppositely to the alternating voltage appearing at said emitters.

5. An amplifier according to claim 4, comprising in further combination, means forming a resonant circuit, tuned to the frequency range of the amplifier, disposed in the base circuit of said second transistor, and means in the collector circuit of said first transistor cooperable with the primary winding of said output transformer to form a resonant circuit tuned to the frequency range of the amplifier.

References Cited

UNITED STATES PATENTS 3,073,968 1/1963 Tribby ---------------- 330—29
3,160,707 12/1964 Meyers ---------------- 330—29

FOREIGN PATENTS 1,103,406 3/1961 Germany.

ROY LAKE, *Primary Examiner.*

J. B. MULLINS, *Assistant Examiner.*